(12) United States Patent
Wang Baldonado et al.

(10) Patent No.: US 8,539,030 B2
(45) Date of Patent: Sep. 17, 2013

(54) SYSTEM AND METHOD FOR MANAGING DIGESTS COMPRISING ELECTRONIC MESSAGES

(75) Inventors: Michelle Q. Wang Baldonado, Palo Alto, CA (US); Paula S. Newman, Los Altos, CA (US); William C. Janssen, Jr., Mountain View, CA (US)

(73) Assignee: Xerox Corporation, Norwalk, CT (US)

( * ) Notice: Subject to any disclaimer, the term of this patent is extended or adjusted under 35 U.S.C. 154(b) by 1010 days.

(21) Appl. No.: 11/974,333

(22) Filed: Oct. 12, 2007

(65) Prior Publication Data

US 2008/0098125 A1 Apr. 24, 2008

Related U.S. Application Data

(63) Continuation of application No. 09/717,278, filed on Nov. 22, 2000, now abandoned.

(51) Int. Cl.
*G06F 15/16* (2006.01)

(52) U.S. Cl.
USPC .......................................... 709/206; 709/232

(58) Field of Classification Search
USPC .................................. 709/206, 232
See application file for complete search history.

(56) References Cited

U.S. PATENT DOCUMENTS

| | | | |
|---|---|---|---|
| 5,377,354 A | 12/1994 | Scannell et al. | |
| 5,619,648 A | 4/1997 | Canale et al. | |
| 5,765,178 A | 6/1998 | Tanaka | |
| 5,802,253 A | 9/1998 | Gross et al. | |
| 5,805,823 A * | 9/1998 | Seitz | 709/236 |
| 5,826,022 A | 10/1998 | Nielsen | |
| 5,832,502 A * | 11/1998 | Durham et al. | 1/1 |
| 5,864,684 A | 1/1999 | Nielsen | |
| 5,903,627 A * | 5/1999 | Shaffer et al. | 379/67.1 |
| 5,917,489 A | 6/1999 | Thurlow et al. | |
| 5,948,058 A | 9/1999 | Kudoh et al. | |
| 5,999,932 A | 12/1999 | Paul | |
| 6,023,723 A | 2/2000 | McCormick et al. | |

(Continued)

FOREIGN PATENT DOCUMENTS

| | | |
|---|---|---|
| GB | 2 324 627 A | 10/1998 |
| GB | 2324627 A * | 10/1998 |
| WO | WO 97/27534 | 7/1997 |

OTHER PUBLICATIONS

Hall, Robert J., "How to Avoid Unwanted Email," Communications of the ACM, ACM Press, pp. 88-95 (Mar. 1998).

(Continued)

*Primary Examiner* — Thomas Dailey
*Assistant Examiner* — Ebrahim Golabbakhsh
(74) *Attorney, Agent, or Firm* — Patrick J.S. Inouye; Krista A. Wittman

(57) ABSTRACT

A system and method for managing digests comprising electronic messages is presented. A selection criteria that defines message-based content for a digest is defined. Properties and characteristics of the content of the digest are defined. A delivery criteria that specifies periodic sending of the digest is accepted. The digest is constructed as a set of electronic messages. A dynamic stream of the electronic messages is monitored. One or more of the electronic messages is evaluated by filtering the electronic messages against the selection criteria. Only those electronic messages that satisfy the selection criteria are grouped into the digest to which the selection criteria corresponds. The digest is periodically delivered upon satisfaction of the delivery criteria.

14 Claims, 8 Drawing Sheets

(56) References Cited

U.S. PATENT DOCUMENTS

| | | | |
|---|---|---|---|
| 6,047,327 A * | 4/2000 | Tso et al. | 709/232 |
| 6,075,994 A * | 6/2000 | Bhat | 455/458 |
| 6,182,118 B1 | 1/2001 | Finney et al. | |
| 6,216,122 B1 | 4/2001 | Elson | |
| 6,249,807 B1 | 6/2001 | Shaw et al. | |
| 6,463,462 B1 * | 10/2002 | Smith et al. | 709/206 |
| 6,493,703 B1 * | 12/2002 | Knight et al. | 1/1 |
| 6,571,234 B1 * | 5/2003 | Knight et al. | 1/1 |
| 6,578,025 B1 * | 6/2003 | Pollack et al. | 1/1 |
| 6,630,944 B1 | 10/2003 | Kakuta et al. | |
| 6,732,185 B1 * | 5/2004 | Reistad | 709/238 |
| 6,801,936 B1 * | 10/2004 | Diwan | 709/219 |
| 6,816,884 B1 | 11/2004 | Summers | |

OTHER PUBLICATIONS

Boone, Gary, "Concept Features in Re: Agent, an Intelligent Email Agent," International Conference on Autonomous Agents 1998, ACM Press, pp. 141-148 (May 1998).

http://www.lsoft.com/products/listserv.asp?item-=listserv.

LISTSERV, The Only E-List Software You Need, pp. 1-2, Nov. 21, 2000.

Thomas W. Malone, et al., Semistructured Messages Are Surprisingly Useful for Computer-Supported Coordination, ACM Transactions on Office Information Systems, vol. 5, No. 2, Apr. 1987, pp. 115-131.

* cited by examiner

SYSTEM AND METHOD FOR MANAGING DIGESTS COMPRISING ELECTRONIC MESSAGES

CROSS-REFERENCE TO RELATED APPLICATION

This patent application is a continuation of U.S. patent application Ser. No. 09/717,278, filed Nov. 22, 2000, abandoned the priority filing date of which is claimed, and the disclosure of which is incorporated by reference.

FIELD

This invention relates to electronic messages. In particular, this invention relates to manipulating electronic messages based on sender-independent rule-based criteria.

BACKGROUND

Three common systems for transferring electronic messages are direct e-mail, mailing lists, and bulletin board services. With direct e-mail, a user sends messages to individuals and receives electronic messages from individuals. With a mailing list, upon a user subscribing to a list, which usually corresponds to one or more particular topics of interest, a mailing list manager delivers all the electronic messages posted to the list to the subscribed user. In a bulletin board type environment, a plurality of users can post or upload electronic messages to a common location for others to see, comment on, or the like. Conversationally related messages, or threads, develop as additional electronic messages are added to the bulletin board system. The bulletin board system may contain messages that are conversationally related, plus messages in which users have interjected additional comments that may or may not pertain to the subject matter in the original thread.

SUMMARY

While existing electronic message systems work well in general, they often tend to overwhelm an electronic message recipient with numerous electronic messages that may or may not be relevant to the recipient. For example, if the user is subscribed to multiple lists, throughout the day a user is likely to receive postings to many of these lists. Some of these posting will be of interest to the user while others are not. Additionally, since the receipt of these postings will be interspersed with the receipt of messages from other sources, the messages sent to a given list during a single day will not be temporally grouped. Therefore, the correlation between the postings can be lost, and it can be difficult for a user to track a conversational thread given the nonlinear arrival of the various electronic messages.

The systems and methods of this invention provide tools for managing electronic messages. In particular, the tools allow for sender-independent digesting and sampling of electronic messages. This rule-based approach to managing electronic messages allows a user to control, for example, when messages are received, how the messages are grouped, and whether to actually receive, or filter, a particular message.

The first tool for managing electronic messages according to this invention is the user-parameterized digest tool. The digest tool allows a user to specify message-based criteria that define candidate messages for a digest, or a compilation of electronic messages. Furthermore, the user can configure the digest tool to specify properties of each digest, such as, formatting, delivery dates, frequency, structural organization, formatting, such as, HTML, extended HTML, dynamic HTML, plain text, or the like.

The second tool for managing electronic messages according to this invention is the user-parameterized sampling tool. The sampling tool allows a user to specify a set of message-based criteria that define candidate messages for sampling or selectively selecting one or more electronic messages. Furthermore, the sampling tool allows a user to specify criteria over the candidate set of messages that define which subset of the candidate messages is actually received. For example, the user can configure the sampling tool to send only every $n^{th}$ message that meets the candidate criteria, send a message that meets the candidate criteria only when there is a topic shift in the message stream, send a message that meets the candidate criteria when that message receives a large number of responses, send a message that meets the candidate criteria when the rate of arrival of messages has changed significantly, or the like. Thus, with the sampling tool, initial candidate messages are identified, and then only if the initial candidate messages meet an additional subset of criteria, is a message actually delivered.

A further embodiment is a system and method for managing digests comprising electronic messages. A selection criteria that defines message-based content for a digest is defined. Properties and characteristics of the content of the digest are defined. A delivery criteria that specifies periodic sending of the digest is accepted. The digest is constructed as a set of electronic messages. A dynamic stream of the electronic messages is monitored. One or more of the electronic messages are evaluated by filtering the electronic messages against the selection criteria. Only those electronic messages that satisfy the selection criteria are grouped into the digest to which the selection criteria corresponds. The digest is periodically delivered upon satisfaction of the delivery criteria.

A still further embodiment is a system and method for sampling electronic messages. A sampling criteria that defines representative message-based content of electronic messages is defined. A delivery criteria that specifies whether each electronic message will be delivered is accepted. A dynamic stream of candidate electronic messages is monitored. One or more of the candidate electronic messages is evaluated by extracting the candidate electronic messages against the sampling criteria. Only those candidate electronic messages that satisfy the sampling criteria are chosen. Sample messages are identified from the chosen candidate electronic messages. One or more of the chosen candidate electronic messages is evaluated against the delivery criteria. Only those chosen candidate electronic messages that satisfy the delivery criteria are selected. The sample messages are delivered.

Conventional list digesting is offered by many list managers to their subscribers. A subscriber who requests "digest mode" for a list receives at regular intervals a single electronic message that encapsulates all electronic messages sent during a specified digest period. Conventional list digesting does not typically offer subscribers options for managing or controlling electronic messages within the digest, nor control over the creation and delivery of the digest itself.

In contrast, the digesting tool according to the systems and methods of this invention allows a user to formulate rules for constructing a digest or sets of electronic messages, regardless of the options offered by the senders of those electronic messages or by the mailing list manager in the cases where messages come from a mailing list. Additionally, the digesting tool according to this invention allows the user full control over the digest format and frequency, independent of what might be offered by the original senders of the electronic messages.

Conventional electronic message filtering allows e-mail users to define message-specific criteria to determine whether an incoming electronic message will be received, or to determine, for example, where an electronic message will be stored. The sampling tool according to this invention allows users to define both a set of electronic messages for sampling and also stream-based criteria for determining what electronic messages from the candidate set will be received. For example, criteria that specify whether an electronic message should be received can be based on population-based criteria rather than single-item-based criteria. For example, a user could employ a conventional filtering technique to specify that only electronic messages from a particular list that do not contain particular word(s), for example, the word "sale" should be received. In contrast, a user could employ the sampling tool according to the systems and methods of this invention to specify that, for example, every sixth electronic message from a particular list should be received. Alternatively, for example, a user might specify that an electronic message from a particular mailing list should only be received when there is a topic shift in that particular stream of electronic messages from one or more contributors to that mailing list.

Aspects of the present invention relate to an electronic message management system comprising an information selection device that identifies an electronic message based on one or more sender-independent message-based rules. An electronic message management device at least one of selects and integrates the electronic message into a digest or samples the electronic message.

Aspects of the present invention also relate to a method for managing electronic message comprising identifying an electronic message based on one or more sender-independent message-based rules and at least one of selecting and integrating the electronic message into a digest or sampling the electronic message.

Aspects of the present invention additionally relate to an information storage media comprising information that identifies an electronic message based on one or more sender-independent message-based rules and that at least one of selects and integrates the electronic message into a digest or samples the electronic message.

Aspects of the present invention additionally relate to an electronic message management system comprising a data selection system that identifies at least one electronic message from a plurality of electronic messages based on a sender based rule. An electronic message management system is functionally associated with the data selection system and is adapted to communicate the at least one electronic message into a file.

Electronic messaging, such as e-mail, has become an increasingly important mode of communication. Many people, however, feel overwhelmed by the quantity of e-mail they receive. Through the use of list digesting and electronic message sampling, e-mail users are able to diminish the interruptions and cognitive load imposed by receipt of electronic messages. In particular, digesting limits interruptions because electronic messages are collected and sent as a single electronic message at regular intervals. This allows electronic messages from the same list to be viewed in close spatial and temporal proximity, lessening the cognitive burden on the user to recall the context surrounding an individual message. With message sampling, a user defines rules that specify message-specific criteria for identifying candidate messages and also rules that define which candidate messages should be delivered. With message sampling, interruptions decrease since fewer messages are received.

Additionally, the systems and methods of this invention can be used in conjunction with U.S. patent application Ser. No. 09/717,303, filed Nov. 22, 2000, pending, entitled "System and Method For Managing a Computer-Mediated Discussion Forum," and U.S. Pat. No. 7,035,903, issued Apr. 25, 2006, entitled "Systems and Methods for the Discovery and Presentation of Electronic Messages that are Related to an Electronic Message," incorporated herein by reference in their entirety.

These and other features and advantages of this invention are described in or are apparent from the following detailed description of the embodiments.

BRIEF DESCRIPTION OF THE DRAWINGS

The embodiments of the invention will be described in detail, with reference to the following figures wherein.

DETAILED DESCRIPTION

Figure 1:
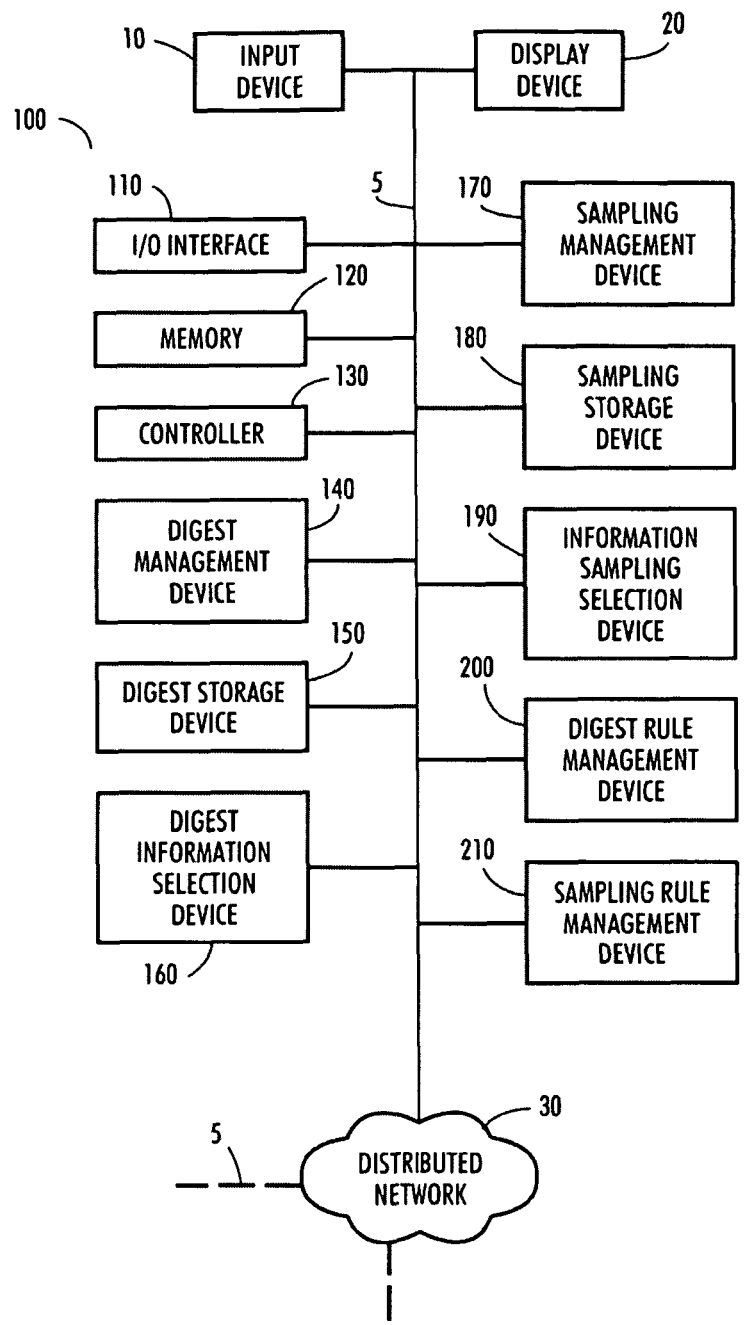
FIG. 1 is a functional block diagram illustrating an exemplary electronic message management system according to this invention.

Historically, digests are only available on request from, for example, e-mail lists that support a digest mode. However, the digest tool according to this invention allows a user to obtain a digest for any information stream, independent of the options provided by a list manager or the information source. The digest tool allows a user to obtain a digest for any set of messages that meet predefined criteria. For example, a user may wish to receive in digest form all messages bearing a particular subject line, for example, to obtain a digest for a thread rather than for a list. Additionally, a user may desire to have more control over the characteristics of a digest. The digest tool according to this invention allows a user to specify the type of digest they receive, for example, the frequency with which it is received, again, regardless of what options are provided by the sender of the e-mail or electronic message that is digested.

Specifically, users establish rules for a digest similarly to how rules are specified for filtering. A digest rule outlines a set of criteria that must be met for a message to be included in a digest. For example, a digest rule might stipulate that all electronic messages sent to "info@parc.xerox.com" should be received in digest mode. As this example illustrates, criteria often resemble fielded Boolean queries, where the fields are common electronic message fields, such as, "To:", "cc:", "From:", "Subject:", or the like. Alternatively, the selection criteria might be specified by the user as an abstraction over a plurality of fields. For example, the user might specify that an electronic message that is sent to a given e-mail address should be digested, where the "sent to" portion of the electronic message might cover both the "To:" and the "cc:" fields. Another exemplary abstraction is "is a party to" which may, for example, cover all address fields. Alternative embodiments of the digest tool may use techniques from information retrieval, thus allowing users to specify that electronic messages similar to the current electronic message should be received in digest mode. In this instance, similarity can be measured, for example, in terms of vector similarity between the body of a selected electronic message and the bodies of incoming electronic messages.

Supplemental to specifying criteria for deciding when messages should be included in a digest, users can also specify characteristics of the digest itself. For example, a user may choose among different digest styles. Some digests may include attachments, while others may not. Some digests include the full text of each message, whereas other digests may include just summary information of the individual messages with, for example, links, such as URLs to the full text of each message. Alternatively, some digests might include simply the first nonquoted line from each sent message. Digests may vary in whether they present messages in increasing or decreasing chronological order. Using the digest tool according to this invention, users may chose to create their own digests using the methods described herein, even for lists that offer digests, in order to receive the digest in the user's preferred style. In addition, users can specify when and how often the digest should be received. For example, a user may choose to receive, for example, one set of messages in a daily digest at a predetermined time, and another set of messages in a weekly digest at another predetermined time.

The sampling tool according to this invention allows users to opt only to view representative messages from a stream of messages that meet a particular set of criteria, or rules. For some electronic messages, readers are not concerned with reading every single message that is sent. Instead, these readers may, for example, merely want to keep abreast of the general directions taken by the conversations in the electronic messages. For example, a user may be interested in peripherally monitoring developments in a particular community even if the user may not be particularly involved in that community. Additionally, monitoring can be applied to sets of messages that do not necessarily correspond to lists. For example, a user may want to only sample messages bearing a particular subject line, for example, to stay abreast of a thread without receiving every message in that particular thread.

Specifying what set of messages should be received with the sampling tool proceeds in a similar way as specifying what set of messages should be received using the digest tool according to this invention. However, wherein the digest tool includes all messages from a set of messages that are arriving in a particular period, sampling of electronic messages results in delivery of only a certain subset of the messages from the set of messages being received. Thus, the second stage of the sampling further defines the criteria that a message must meet to be forwarded to a user. In contrast to electronic message filters, where the criteria for message delivery are typically message-based, sampling techniques may refer to characteristics of the defined message population. Frequency-based sampling rules stipulate that every $n^{th}$ message to meet the sampling criteria should appear in a user's inbox. Alternatively, for example, a representative message from the sampled pool of messages might be sent every predetermined number of days.

More complex rules may be put in to place to specify when a message should appear. For example, a user may specify that a message should be delivered whenever the "topic" of the information stream has shifted. For example, video thumbnailing techniques allow a video to be summarized by a series of stills, where each still is the first still to occur after a scene change. A variety of techniques may also be used to determine that a topic has changed, ranging from simple algorithms that equate topics with subject lines to more sophisticated algorithms that, for example, cluster messages to determine major topic changes. An alternative to this form of sampling is to assign a priority level to a message and to send it only if the message priority exceeds a set threshold and the number of recently delivered sample messages has not exceeded a separate threshold. Factors that may contribute to a message's priority level may include, for example, its length, the number of attachments, keywords, genre, number of responses, importance of the sender, or the like, for example, does the message pertain to a vacation, jokes, or a meeting coordination. A message's priority level may change over time as additional messages are received and reviewed.

FIG. 1 illustrates an exemplary electronic message management system 100. The electronic message management system 100 comprises an I/O interface 110, a memory 120, a controller 130, a digest management device 140, a digest storage device 150, a digest information selection device 160, a sampling management device 170, a sampling storage device 180, an information sampling selection device 190, a digest rule management device 200 and a sampling rule management device 210, all interconnected by link 5. The electronic message management system 100 is also connected to at least one distributed network 30 which may or may not also be connected to one or more other electronic message management systems or other distributed networks, as well as one or more input devices 10 and display devices 20.

While the exemplary embodiment illustrated in FIG. 1 shows the electronic message management system 100 and associated components collocated, it is to be appreciated that the various components of the electronic message management system 100 can be located at distant portions of a distributed network, such as a local area network, a wide area network, an intranet and/or or the internet or within a dedicated electronic message management system. Thus, it should be appreciated that the components of the electronic message management system 100 can be combined into one device or collocated on a particular node of a distributed network. As will be appreciated from the following description, and for reasons of computational efficiency, the components of the electronic message management system can be arranged at any location within a distributed network without affecting the operation of the system.

Furthermore, the links 5 can be a wired or wireless link or any known or later developed element(s) that is capable of supplying and communicating electronic data to and from the connected elements. Additionally, the input device 10 can be a keyboard, mouse, speech to text converter, or the like. The display device 20 can be a computer monitor, a display on a PDA, or any other device capable of displaying information to one or more users.

In operation, a user via input device 10, and with the cooperation of the I/O interface 110, the memory 120, the controller 130, and the digest management device 140, establishes rules for assembling a digest of electronic messages. In particular, these rules can specify that a message must, for example, be from one or more lists, be about a particular subject matter, be from a particular sender, include a particular e-mail address in either the "To:" or "cc:" fields of the message, or the like. The rules are then stored in the digest rule management device 200.

Thus, depending on the rules governing the digest management device 140, one or more sources of information, such as electronic message streams, are monitored. The incoming message streams are received via the links 5 in the distributed network 30. Specifically, one or more information streams comprising electronic messages are received via the link 5 and one or more distributed networks 30 are analyzed by the digest management device 140. The digest management device 140 determines if selection criteria for establishing a digest have been met. If, after a comparison of the incoming message to the rules stored in the digest rule management device 200, an electronic message in the incoming information stream meets one or more selection criteria, the digest management device 140 in cooperation with the digest information selection device 160 determines an appropriate digest to which the selected electronic message should be added. For example, a user may have established a plurality of different digests. Therefore, based on the rules governing the operation of the digest management device 140, different electronic messages can be routed for integration into different digests. If an incoming electronic message meets a predefined criteria for being added to an already existing digest, the incoming electronic message can be added to that digest. However, if a digest does not exist but an electronic message meets a given selection criteria, the digest management device 140 can create a new digest which is stored in the digest storage device 150. This selected electronic message is then added to the new digest and the updated digest stored in the digest storage device 150. This process of scanning information streams for electronic messages that meet certain selection criteria continue until a trigger is met that forwards one or more digests to the user.

Specifically, a user can define in the digest rule management device 200, for example, at a predetermined time, when a threshold number of messages has been received, when the user's inbox is at a predetermined size, when the user's activity level is at a predetermined threshold, or the like, at which point the digest, stored in the digest storage device 150 is forwarded to a user and displayed, for example, on the display device 20.

More particularly, the digest rule management device 200 interfaces with the user to store and manage rules governing the selection of electronic messages in one or more information streams. As previously discussed, these rules can include Boolean comparisons, statistical-based selection criteria, fuzzy logic based selection criteria, keyword based selection criteria, date, subject, recipient or sender based selection criteria, or the like. Thus, the digest information selection device 160, cooperating with the digest rule management device 200, the I/O interface 110, the memory 120 and controller 130 are capable of continuously monitoring one or more information streams of, for example, electronic messages, received via link 5 and the distributed network 30.

Sampling of electronic messages is accomplished similarly to assembling a digest of electronic messages. Specifically, the sampling management device 170 in cooperation with the sampling rule management device 210 and the information sampling selection device 190 monitor one or more information streams received via links 5 and the distributed network 30. These information streams can include, for example, electronic messages such as e-mail messages, or any serial message stream or serial database recording system events such as events in a research laboratory where the events may include, for example, customary visits or inventions filed, or the like, or combinations thereof.

Thus, once the sampling thread selection criteria have been determined and established by a user, and saved in the sampling rule management device 210, incoming electronic messages are monitored to determine if they meet one or more of the selection criteria established by the sampling rules. If one or more incoming electronic messages meet the initial selection criteria, that electronic message is selected. Next, the information sampling selection device 190, in cooperation with the sampling management device 170 and the sampling rule management device 210 performs a check to determine if supplemental selection criteria are present. Thus, a user can specify a set of message-based criteria that define candidate messages for sampling and also specify criteria that define a subset of messages to be received. These supplemental selection criteria allow for selection of one or more subsets of electronic messages based on rules stored in the sampling rule management device 210. This process continues until all selection rules that apply to initially selected messages have been applied. If the sampled electronic message meets the one or more selection criteria, the selected electronic message is stored in the sampling storage device 180. Then, the electronic message can be forwarded to a destination as defined in the sampling management device 170.

Alternatively, if the initially selected electronic message fails one or more of the sampling selection criteria, the message is not sampled, and the information sampling selection device 190 returns to monitoring electronic messages in the one or more information streams.

Figure 2:
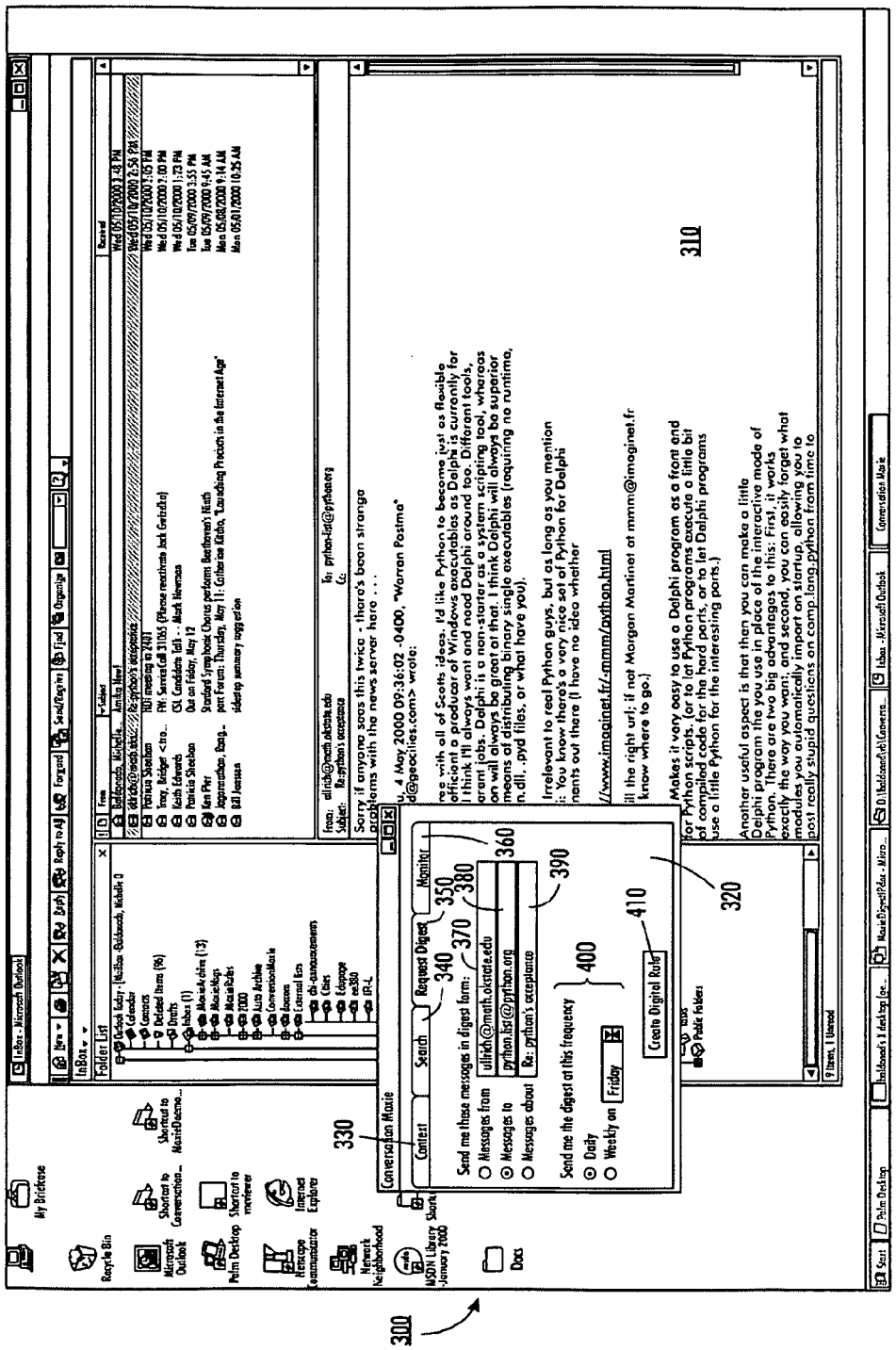
FIG. 2 is a screen shot illustrating an exemplary user interface according to this invention.

FIG. 2 illustrates an exemplary user interface 300. The user interface 300 comprises an electronic message portion 310 and an electronic message management portion 320. The electronic message management portion 320 comprises a context portion 330, a search portion 340, a monitor portion 360 and a digest portion 350, comprising selection criteria portions 370-390, digest forwarding criteria portions 400 and a create digest rule selection button 410.

The digest portion 350 illustrates exemplary selection criteria for assembling electronic messages in digest form. Specifically, the digest portion 350 allows assembly of messages in digest form by specifying one or more of "From:" criteria 370 "To:" criteria 380 and about or "Subject:" criteria 390. Additionally, the digest portion 350 allows a user to specify when a digest is to be delivered. In this exemplary embodiment, a user can select either daily or weekly delivery options in the delivery selection portion 400. Upon completing the digest selection and delivery options, a user selects, for example with the click of a mouse, the create digest rule button 410. The digest rule is then stored in the digest rule management device 200.

Figure 3:
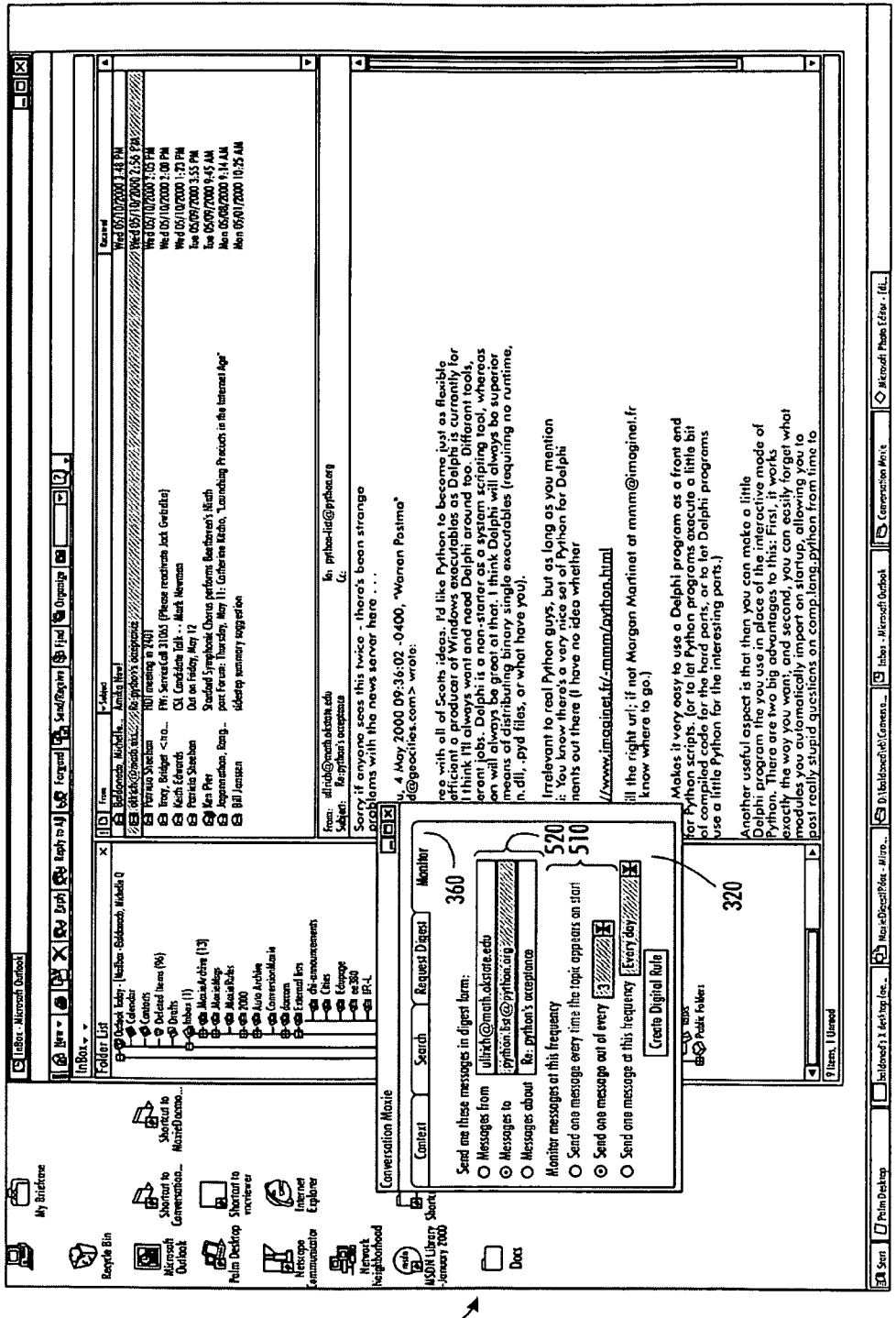
FIG. 3 is a screen shot illustrating an exemplary user interface according to this invention.

FIG. 3 illustrates an exemplary user interface 500 that may be displayed during creation of one or more sampling rules. In particular, the user interface 500 comprises the electronic message management portion interface 320, comprising a monitor portion 360, a monitoring frequency selection portion 510 and a monitoring message portion 520.

In particular, the monitor frequency selection portion 510 allows a user to select, for example, to "Send one message out of every three" messages. Alternatively, a user can select to send one message every time a topic appears to shift, to send a message at a predetermined frequency, or the like.

The pattern matching portion 520 allows a user to select, for example, messages from, to, or about specified criteria. Upon selection of the pattern matching and frequency monitoring characteristics, a user finalizes and creates the sampling rule which is stored in the sampling rule management device 210.

Figure 4:
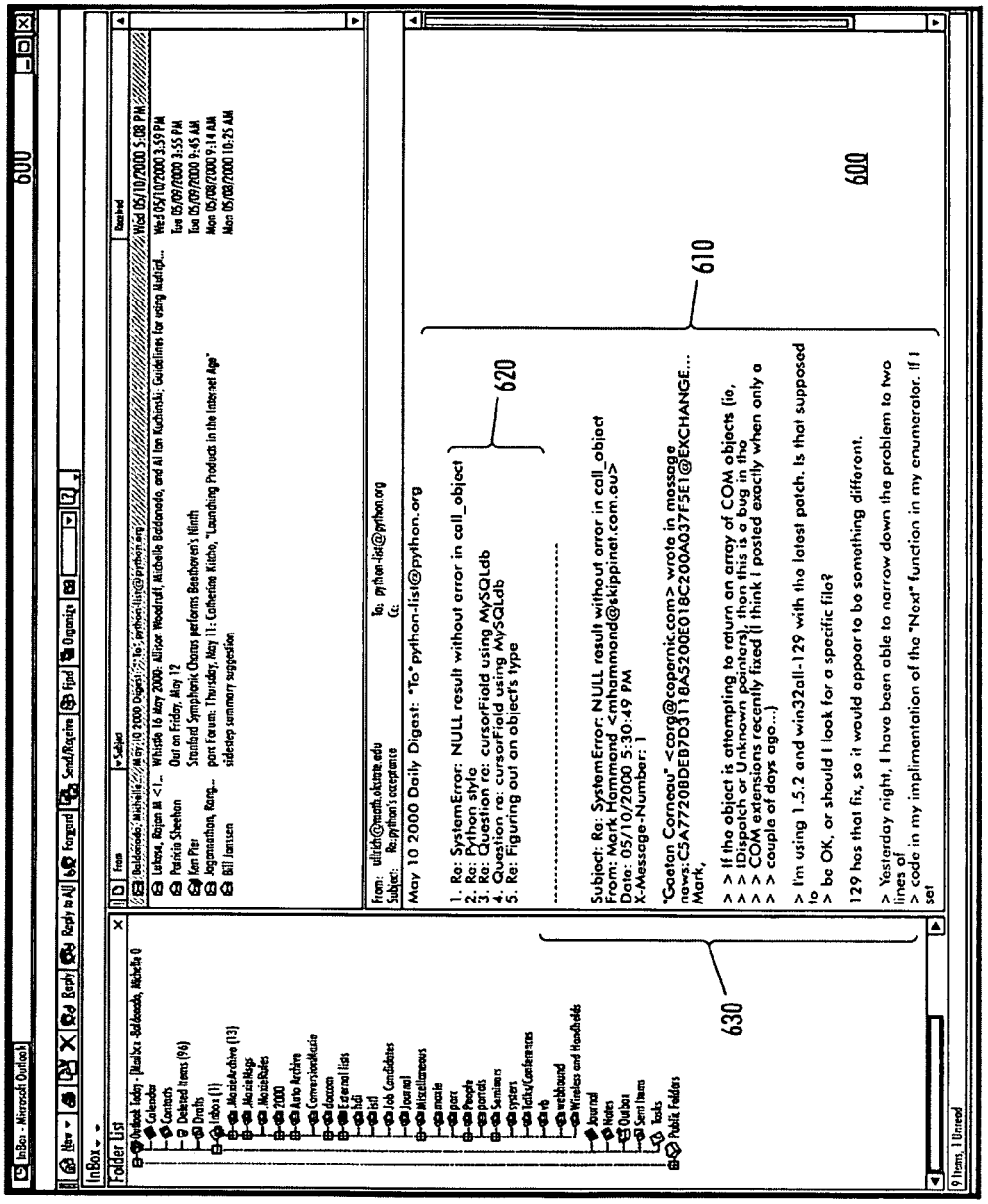
FIG. 4 is a screen shot of an exemplary user interface according to this invention.

FIG. 4 illustrates an exemplary message display user interface 600. The exemplary message display user interface 600 comprises an illustrative digest 610. The digest 610 comprises, for example, an index 620 of the messages within the digest, and the message bodies themselves 630.

Figure 5:
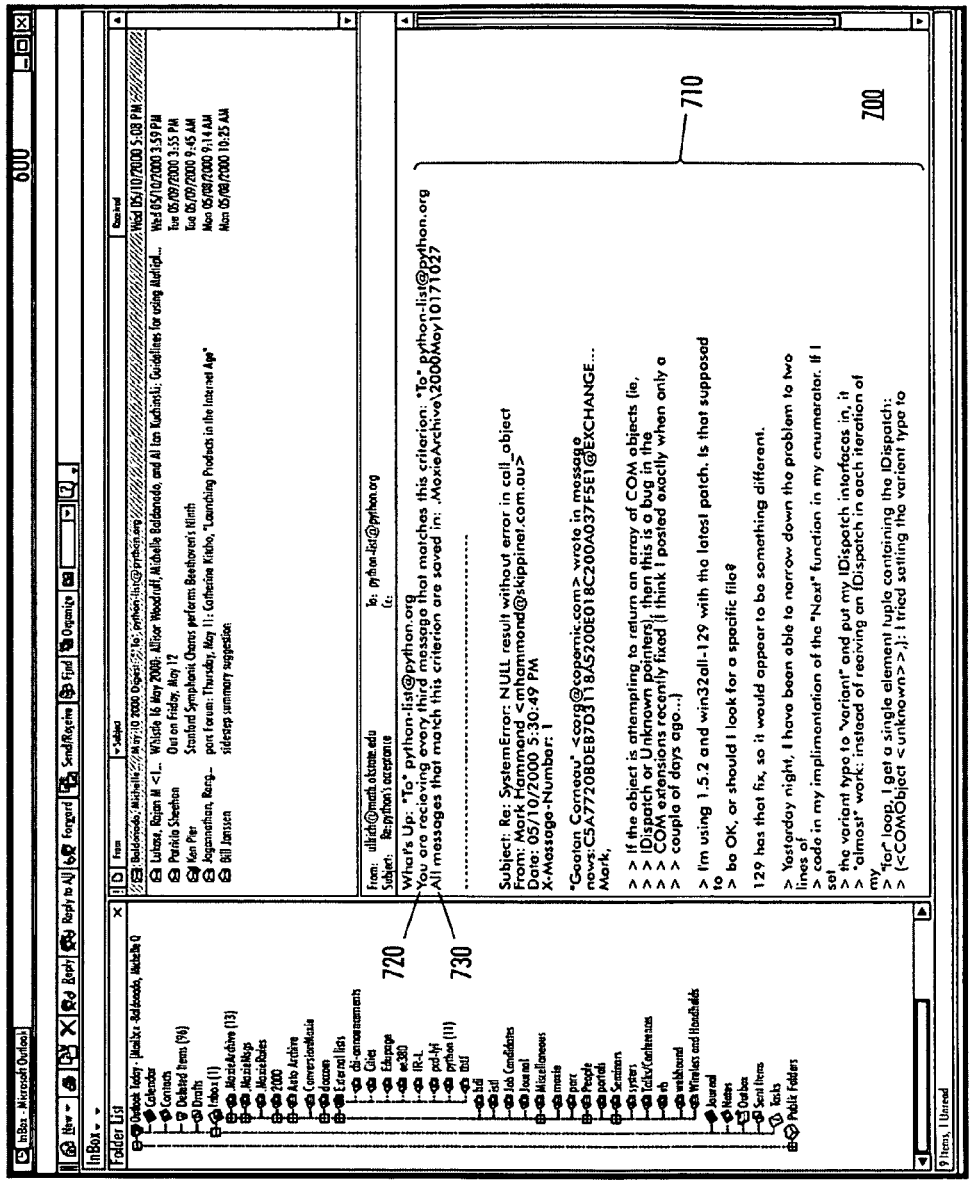
FIG. 5 is a screen shot of an exemplary user interface according to this invention.

FIG. 5 illustrates an exemplary user interface 700 which illustrates an exemplary sampling of electronic messages 710. The sampling includes an indication portion 720 summarizing the sampling criteria. Additionally, the sample message 710 comprises a location portion 730 summarizing where all messages that match the candidate selection rules have been stored.

Figure 6:
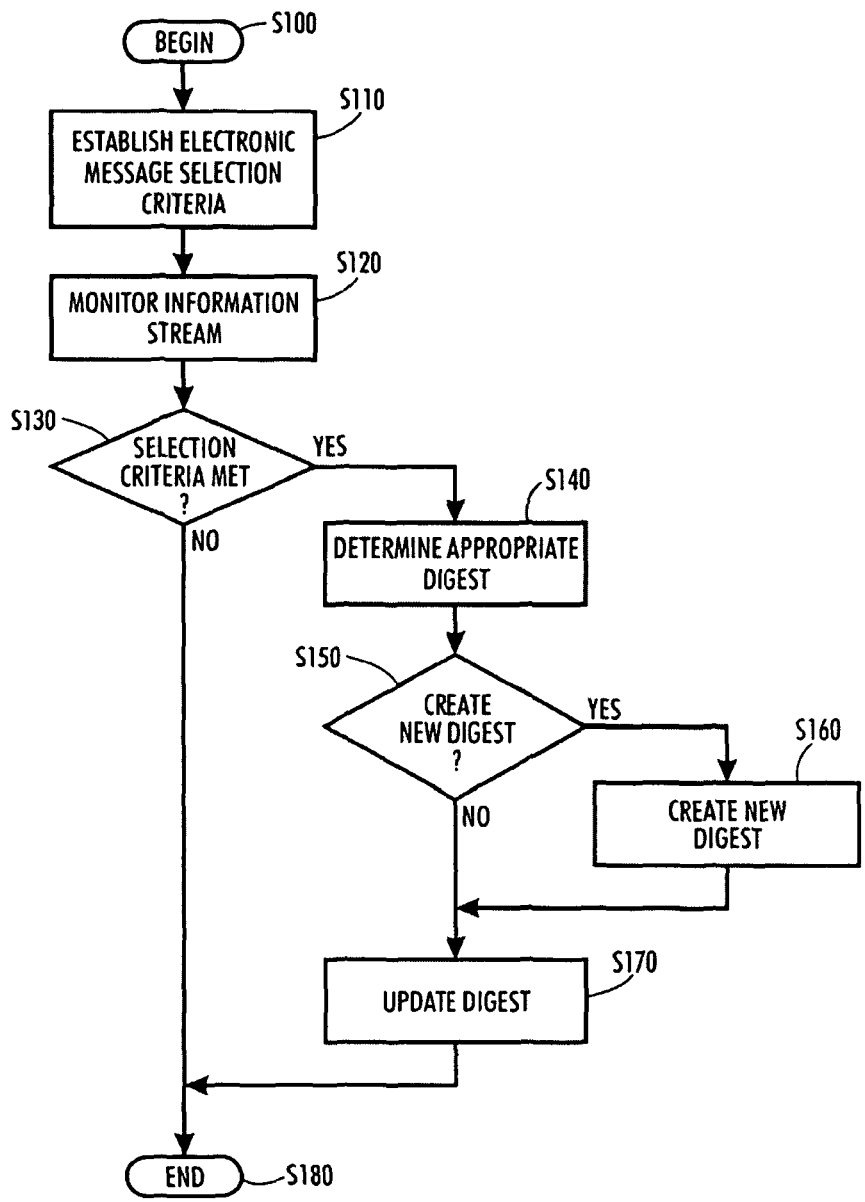
FIG. 6 is a flowchart outlining an exemplary method for digesting electronic messages according to this invention.

FIG. 6 illustrates an exemplary embodiment of managing a digest according to this invention. In particular, control begins in S100 and continues to S110. In S110, the electronic message selection criteria are established. Next, in S120, one or more information streams are monitored. Then, in S130, a determination is made whether the selection criteria have been met. If the selection criteria have been met, control continues to S140. Otherwise, control jumps to S180.

In S140, the appropriate digest is determined for the selected electronic message. Next, in S150, a determination is made whether a new digest is required for the selected electronic message. If a new digest is required, control continues to S160 where a new digest is created. Otherwise, control jumps to S170 where an already existing digest is updated with the newly selected electronic message. Control then continues to S180 where the control sequence ends.

Figure 7:
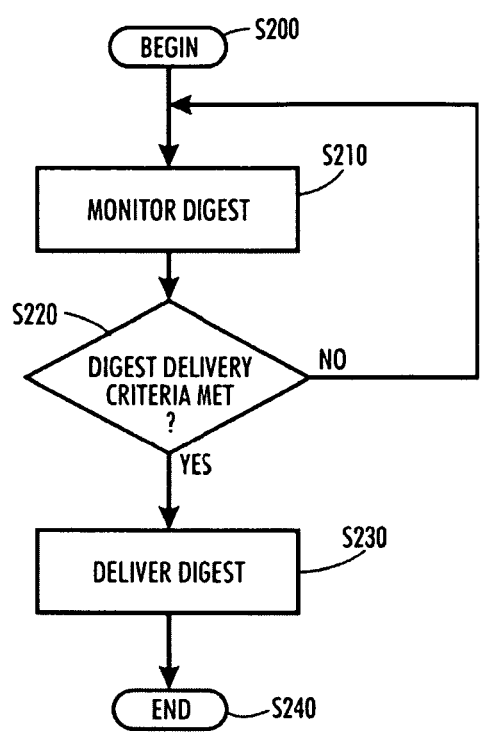
FIG. 7 is a flowchart outlining an exemplary method for delivering a digest according to this invention.

FIG. 7 is a flowchart outlining an exemplary embodiment for delivering a digest upon satisfaction of one or more digest rules. In particular, control begins at S200 and continues to S210. In S210, a digest is monitored. Next, in S220, a determination is made whether the digest delivery criteria have been met. If the digest delivery criteria have been met, control continues to S230 where the digest is delivered to a user. Otherwise, control jumps back to S210. Control then continues to S240 where the control sequence ends.

Figure 8:
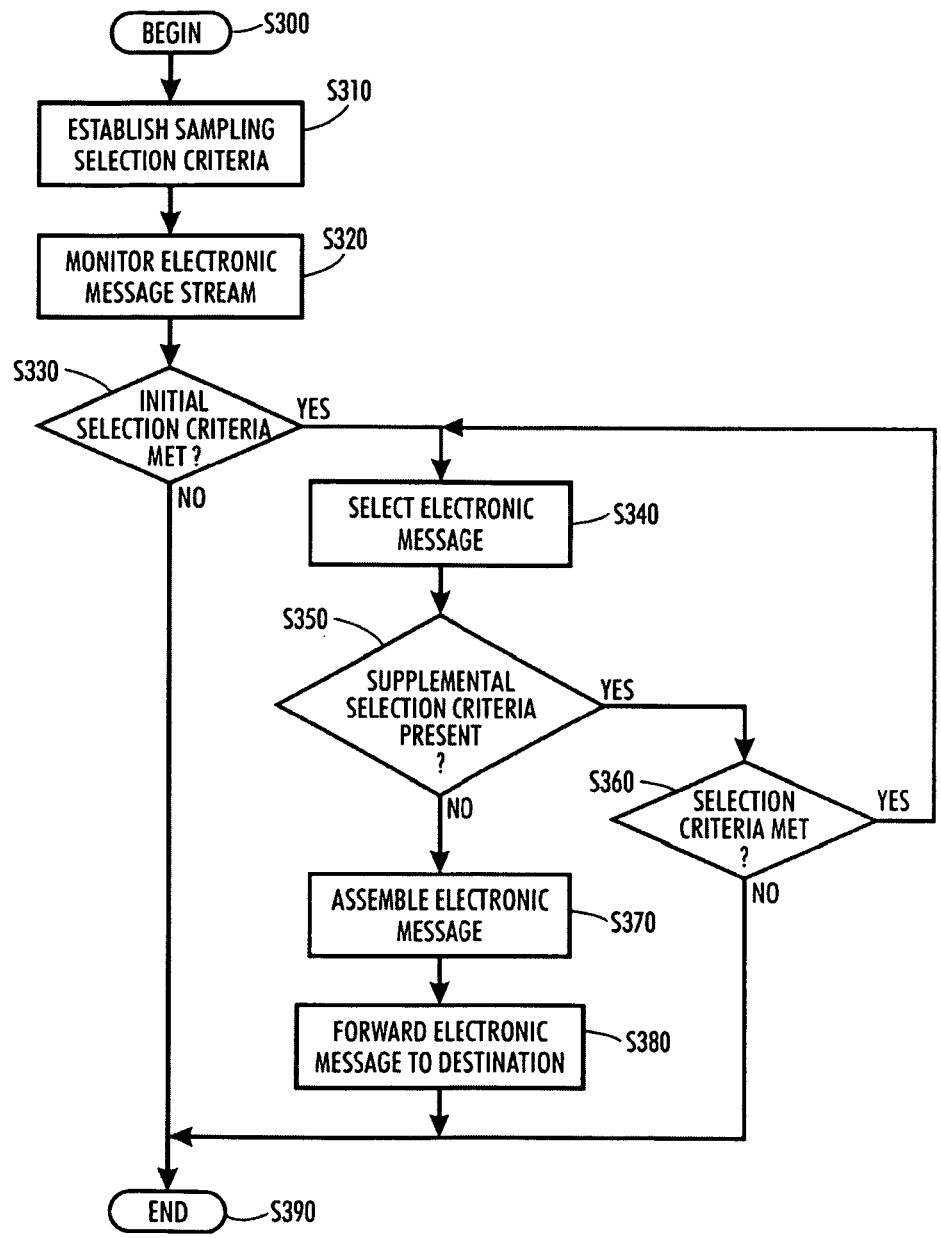
FIG. 8 is a flowchart outlining an exemplary method for sampling electronic messages according to this invention.

FIG. 8 outlines an exemplary embodiment for performing sampling of electronic messages according to this invention. In particular, control begins in S300 and continues to S310. In S310, the sampling selection criteria are established. Next, in S320, one or more electronic message streams are monitored. Then, in S330, a determination is made whether selection criteria have been met. If selection criteria have been met, control continues to S340. Otherwise, control jumps to S390.

In S340, the electronic message meeting the initial selection criteria is selected. Next, in S350, a determination is made whether supplemental selection criteria are present. If supplemental selection criteria are present, control continues to S360. Otherwise, control jumps to S370.

In S360, a determination is made whether supplemental selection criteria have been met. If the supplemental selection criteria have been met, control continues back to S340. Otherwise, control jumps to S390.

In S370, the sample electronic messages are assembled. Next, in S380, the electronic messages are delivered to a predetermined destination. Control then continues to S390 where the control sequence ends.

As shown in FIG. 1, the electronic message management system is can be implemented either on a single program general purpose computer, or a separate program general purpose computer. However, the electronic message management system can also be implemented on a special purpose computer, a programmed microprocessor or microcontroller and peripheral integrated circuit element, an ASIC or other integrated circuit, a digital signal processor, a hardwired electronic or logic circuit such as a discrete element circuit, a programmable logic device such as a PLD, PLA, FPGA, PAL, or the like. In general, any device capable of implementing a finite state machine that in turn is capable of implementing the flowcharts illustrated in FIGS. 6-8 can be used to implement the electronic message management system according to this invention.

Furthermore, the disclosed method may be readily implemented in software using object or object-oriented software development environments that provide portable source code that can be used on a variety of computer or workstation hardware platforms. Alternatively, the disclosed electronic message management system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or micro computer systems being utilized. The electronic message management systems and methods illustrated herein however, can be readily implemented in hardware and/or software using any known or later-developed systems or structures, devices and/or software by those of ordinary skill in the applicable art from the functional description provided herein and with a general basic knowledge of the computer arts.

Moreover, the disclosed methods may be readily implemented as software executed on a programmed general purpose computer, a special purpose computer, a microprocessor, or the like. In these instances, the methods and systems of this invention can be implemented as a program embedded on a personal computer such as a Java® or CGI script, as a resource residing on a server or graphics workstation, as a routine embedded in a dedicated electronic message management system, a web browser, an electronic message enabled cellular telephone, a PDA, a dedicated electronic message or e-mail management system, or the like. The electronic message management system can also be implemented by physically incorporating the system method into a software and/or hardware system, such as the hardware and software systems of a graphics workstation or dedicated electronic message management system.

It is, therefore, apparent that there has been provided, in accordance with the present invention, systems and methods for managing electronic messages. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A system for managing digests comprising electronic messages, comprising:

a selection criteria module to define a selection criteria that defines message-based content for a digest;

a content module to define properties and characteristics of the content of the digest;

a delivery criteria input module to accept a delivery criteria that specifies periodic sending of the digest to a user upon determining an inbox of the user is at a predetermined size and an activity level of the user satisfies a predetermined threshold;

a construction module to construct the digest as a set of electronic messages, comprising:

a digest management module to monitor a dynamic stream of the electronic messages and to evaluate one or more of the electronic messages by filtering the electronic messages against the selection criteria; and a digest information module to group only those electronic messages that satisfy the selection criteria into the digest to which the selection criteria corresponds; and a delivery module to periodically deliver the digest when a threshold count of electronic messages in the user's inbox is satisfied; and a processor to execute each of the modules, which are stored on a computer-readable storage medium.

2. A system according to claim 1, further comprising:
a criteria determination module to select the selection criteria from the group comprising Boolean comparison, statistical-based selection, fuzzy logic, keyword selection, date, subject, recipient, sender-independent selection, and a sender-based selection.

3. A system according to claim 1, further comprising:
a criteria management module to specify the selection criteria based on at least one of common electronic message fields, an abstraction of a plurality of the common electronic message fields, all of the common electronic message fields, vector similarity between a body of one of the electronic message and the bodies of others of the electronic messages, and selective sampling.

4. A system according to claim 1, further comprising:
a property module to select the properties from the group comprising formatting, delivery dates, frequency, and structural organization.

5. A system according to claim 1, further comprising:
a characteristic module to select the characteristics from the group comprising different digest styles, attachment inclusion, attachment exclusion, full text inclusion, summary inclusion with links to full text, first nonquoted line, increasing chronological ordering, decreasing chronological ordering, and user-specified style.

6. A system according to claim 1, further comprising:
an index module to form an index of the electronic messages in the digest; and an electronic message module to provide the index in a single electronic message either in lieu of or in addition to inclusion of the electronic messages.

7. A method for managing digests comprising electronic messages, comprising:
defining a selection criteria that defines message-based content for a digest;
defining properties and characteristics of the content of the digest;
accepting a delivery criteria that specifies periodic sending of the digest to a user upon determining an inbox of the user is at a predetermined size and an activity level of the user satisfies a predetermined threshold;
constructing the digest as a set of electronic messages, comprising:
monitoring a dynamic stream of the electronic messages;
evaluating one or more of the electronic messages by filtering the electronic messages against the selection criteria; and
grouping only those electronic messages that satisfy the selection criteria into the digest to which the selection criteria corresponds; and
periodically delivering the digest when a threshold count of electronic messages in the user's inbox is satisfied.

8. A method according to claim 7, further comprising:
selecting the selection criteria from the group comprising Boolean comparison, statistical-based selection, fuzzy logic, keyword selection, date, subject, recipient, sender-independent selection, and a sender-based selection.

9. A method according to claim 7, further comprising:
specifying the selection criteria based on at least one of common electronic message fields, an abstraction of a plurality of the common electronic message fields, all of the common electronic message fields, vector similarity between a body of one of the electronic message and the bodies of others of the electronic messages, and selective sampling.

10. A method according to claim 7, further comprising:
selecting the properties from the group comprising formatting, delivery dates, frequency, and structural organization.

11. A method according to claim 7, further comprising:
selecting the characteristics from the group comprising different digest styles, attachment inclusion, attachment exclusion, full text inclusion, summary inclusion with links to full text, first nonquoted line, increasing chronological ordering, decreasing chronological ordering, and user-specified style.

12. A method according to claim 7, further comprising:
forming an index of the electronic messages in the digest; and
providing the index in a single electronic message either in lieu of or in addition to inclusion of the electronic messages.

13. A system according to claim 1, wherein the selection criteria are based on at least one of peripherally monitored community developments, a general direction of a conversation, messages in a thread, non-thread messages, and selective sampling.

14. A system according to claim 1, further comprising:
defining the delivery criteria by characteristics of a message population comprising the message-based content.

* * * * *